United States Patent [19]

Larson et al.

[11] Patent Number: 5,059,456
[45] Date of Patent: Oct. 22, 1991

[54] LATEX BARRIER TIECOAT FOR USE WITH MASTIC COATINGS

[75] Inventors: Gary R. Larson, Hatfield; George A. Papsin, Jr., North Wales; Donald A. Winey, Warminster, all of Pa.

[73] Assignee: Rohm and Haas Company, Philadelphia, Pa.

[21] Appl. No.: 519,624

[22] Filed: May 4, 1990

[51] Int. Cl.$^5$ .................. B05D 1/36; B05D 7/00
[52] U.S. Cl. .................. 427/407.1; 524/399; 524/432; 524/522; 526/318.44
[58] Field of Search .................. 427/407.1; 524/399, 524/432, 522; 526/318.44

[56] References Cited

U.S. PATENT DOCUMENTS

| | | | |
|---|---|---|---|
| 3,266,925 | 8/1966 | Lovness | 117/27 |
| 3,620,810 | 11/1971 | Carter | 117/72 |
| 4,291,086 | 9/1981 | Auten | 428/242 |
| 4,571,415 | 2/1986 | Jordan | 524/428 |
| 4,814,373 | 3/1989 | Frankel et al. | 524/460 |

FOREIGN PATENT DOCUMENTS 258988  3/1988  European Pat. Off. .

OTHER PUBLICATIONS

Ser. No. 262,369, filed 10/25/88, by Jordan Jr.

Primary Examiner—Michael Lusignan

[57] ABSTRACT

A method for improving the quality of a mastic coating system by using a latex barrier tiecoat which is composed of a water-insoluble latex polymer and a multivalent metal ion. The tiecoat is applied to a substrate and then a mastic coating is applied to the tiecoat to yield a mastic coating system having excellent resistance to blistering when the mastic coating system is exposed to long-term ponded water.

9 Claims, No Drawings

LATEX BARRIER TIECOAT FOR USE WITH MASTIC COATINGS

FIELD OF THE INVENTION

This invention relates to a method for improving the quality of a mastic coating system by using a latex barrier tiecoat, disposed between a substrate and at least one subsequent coating. More particularly, this invention is directed to a latex barrier tiecoat composed of a water-insoluble latex polymer and a multivalent metal ion which provides improved properties to a mastic coating system when the latex barrier tiecoat is disposed between a substrate and the mastic coating.

BACKGROUND OF THE INVENTION

A large percentage of the roofing market utilizes asphalt-based products, for example, modified bituminous rolls, as a base substrate which is then topcoated with conventional roof mastics to improve durability (asphalt degradation), provide energy savings (white coating vs. black asphalt), reduce the fire rating and improve aesthetics. Such coatings are frequently referred to as "roof mastics" although "mastic coatings" as used herein includes any such thick coatings applied to a substantially horizontal surface such as, for example, a roof deck, to a substantially vertical surface such as, for example, a wall, or to other substrate surfaces. Unfortunately, these mastic coatings have deficiencies. A roof deck, or other surfaces, by design or because of imperfections, may retain water. This ponded water results in loss of adhesion and blistering leading to failure of the mastic coating. The tiecoats of this invention positioned between the substrate and the mastic topcoat solve such problems.

DESCRIPTION OF THE PRIOR ART

U.S. Pat. No. 3,620,810 discloses a three layer waterproof roof coating with a first layer comprising gypsum, perlite, clay, and other inorganic components, a second layer comprising a waterproof coating containing the components of the first layer with emulsified asphalt added thereto, and a top coating consisting of a polyvinylacetate emulsion and titanium dioxide.

U.S. Pat. No. 4,291,086, discloses a coating of high tensile strength and resilience for roofs and swimming pools comprising an asphalt underlayer, an intermediate layer of woven glass fabric, a first overlayer of acrylic emulsion bonded to the underlayer and intermediate layer and a second overlayer of acrylic resin emulsion bonded to the first overlayer. The coating is disclosed to minimize splitting, localized cracking, wrinkling and blistering and may provide stable cover of existing cracks and wrinkles, for example, on old roofs.

European Patent Application 258,988 discloses coating mastic or caulking compositions which have permanent low temperature flexibility and very low residual tack when cured. These compositions are applied as single layer coatings.

European Patent Application 187,505 discloses an aqueous dispersion which may be used as a coating composition for flexible and rigid substrates, or as a caulking composition or as a roof mastic composition which has reduced swelling in water and solvents and has reduced tack.

U.S. Pat. No. 3,266,925 discloses an oil-stain-resistant roofing and siding sheet configuration in which lightweight oil fractions migrating from asphalt and bituminous substrates are prevented from staining decorative colored embedded granules by coating the granules with an anionic oleophobic fluorocarbon sizing agent. The incorporation of a cationic polyamine salt into the substrate layer adapted to react with the anionic fluorocarbon coating improves the adhesion between the fluorocarbon coated granules and the substrate layer.

U.S. Pat. No. 4,571,415 discloses water-based coatings and caulking compositions for exterior surfaces which upon application quickly develop resistance to being washed out by inadvertent precipitation. These compositions comprise an aqueous dispersion of water-insoluble latex polymer prepared by emulsion polymerization, inorganic pigment dispersed with anionic polymer, and a water-soluble salt of a multivalent complex ion having labile, volatile ligands such as zinc ammonium complex ion. This invention is directed to compositions for exterior surfaces and does not disclose the use of these compositions as intermediate coats, or tiecoats.

None of the above references teach the use of a tiecoat disposed between a substrate and a mastic coating to solve problems which prevent achieving an effective mastic system.

It is an object of this invention to provide a water-based tiecoat disposed between a substrate and a mastic coating to give the mastic coating system superior properties, especially with respect to adhesion and blister resistance.

SUMMARY OF THE INVENTION

This invention discloses a method for improving the quality of a mastic coating system consisting of:
(a) forming a tiecoat composition incorporating a waterinsoluble latex polymer and a multivalent metal ion, wherein the latex polymer is prepared from a monomer mixture comprising at least 20 weight %, based on the weight of the monomer mixture, of at least one hydrophobic monomer selected from the group consisting of $C_4$–$C_{20}$ alkyl methacrylates and $C_8$–$C_{20}$ alkyl acrylates, and from about 3.0 weight % to about 7.5 weight % of methacrylic acid, based on the weight of the monomer mixture, and where the latex polymer has a glass transition temperature of from about $-20°$ C. to about $5°$ C., and where the molar ratio of the multivalent metal ion to the methacrylic acid in the latex polymer is from about 1:1 to about 0.375:1;
(b) applying the tiecoat composition to a substrate surface; and
(c) applying a mastic coating.

Mastic coating systems of this invention display good adhesion and superior resistance to blistering especially when exposed to ponded water.

DETAILED DESCRIPTION OF THE INVENTION

This invention is directed to a method for improving the quality of a mastic coating system by using a tiecoat composition disposed between the modified bituminous sheet substrate and the topcoat, which results in a mastic coating system having good adhesion and excellent resistance to blistering, especially when exposed to ponded water.

The latex polymer used in the tiecoat is prepared by emulsion polymerization techniques well known in the art. The monomer mixture used to prepare the latex polymer must contain at least 20 wt. % (based on total monomers) of at least one hydrophobic monomer selected from the group consisting of $C_4$-$C_{20}$ alkyl methacrylates and $C_8$-$C_{20}$ alkyl acrylates. For example, butyl methacrylate, isobutyl methacrylate, hexyl methacrylate, octyl methacrylate, isoctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate, octyl acrylate, isooctyl acrylate, decyl acrylate, isodecyl acrylate, lauryl acrylate, bornyl acrylate, isobornyl acrylate, myristyl acrylate, pentadecyl acrylate, stearyl acrylate and the like. In a preferred embodiment the hydrophobic monomer used to form the polymer is from about 20 wt. % to about 40 wt. %, based on the weight of total monomers. Especially preferred monomers are isodecyl methacrylate and isobutyl methacrylate and mixtures thereof.

Other monomers which can be included to achieve the desired glass transition temperature are methyl methacrylate, ethyl methacrylate, propyl methacrylate, isopropyl methacrylate, methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate and the like.

The monomer mixture used to prepare the latex polymer must also contain from about 3.0 wt. % to about 7.5 wt. % (based on the weight of total monomers) of methacrylic acid. A preferred level of methacrylic acid is from about 3.5 wt. % to about 5.0 wt. %.

"Glass transition temperature", or "Tg", used herein means the glass transition temperature of a polymer as calculated by the Fox equation.

It is required that the monomer components of the latex polymer be selected such that the Tg of the dried latex polymer is from about $-20°$ C. to about $+5°$ C. and a Tg of about $-20°$ C. to about $-10°$ C. is preferred. Polymers having Tg's above about $+5°$ C. yield coatings which lose their flexibility at low temperature. Polymers having Tg's below about $-20°$ C. are prone to bleed-through wherein the color bodies in the substrate migrate into the topcoat and deteriorate the performance of the mastic coating system.

Latex polymers having Tg's of about $-20°$ C. to about $+5°$ C. are not sufficiently tack free at the temperatures at which roofing materials may be applied, which can exceed $130°$ F. Therefore, it is necessary to incorporate a multivalent metal ion into the tiecoat composition to achieve a tack-free coating. Multivalent metal ions such as calcium, magnesium, zinc, barium, strontium, and the like may be used. Complexes of multivalent metal ions, such as zinc hexammonia and the like, and salts of multivalent metal ions with counterions, such as chloride, acetate, bicarbonate and the like, may be used. Zinc is the preferred multivalent metal ion.

The molecular weight of the latex polymer influences blister resistance. Reducing the molecular weight of the polymer improves blister resistance. Molecular weight can be controlled by a wide variety of chain transfer agents well known to those skilled in the art. These include, for example, alkyl mercaptans, halogen compounds, and the like. A chain transfer agent such as, for example, n-dodecyl mercaptan (n-DDM), used at the level of about 0.25 wt. % (based on the weight of total monomers) to about 2.5 wt. % is effective in providing the desired molecular weight. Weight average molecular weight (Mw) was determined by hydrolyzing the polymer to its acrylic acid/methacrylic acid backbone and then determining the weight average molecular weight by aqueous gel permeation chromatography. Weight average molecular weight from about 10,000 to about 150,000 gives the best resistance to blistering.

The level of multivalent metal ion in the tiecoat composition must be controlled to achieve a tack-free coating and this is accomplished by controlling the molar ratio of added multivalent metal ion to methacrylic acid in the polymer tiecoat. Molar ratios of multivalent metal ion/methacrylic acid as low as about 0.375:1 and as high as about 1:1 can be used. A molar ratio of about 0.5:1 is preferred.

EXAMPLE 1

Preparation of Latex Polymer 1

To a 5 liter, 4 neck, round bottom flask, equipped with a mechanical stirrer and condenser, 636.2 g. of deionized (DI) water was added and heated to $85°$ C. under nitrogen. At $85°$ C. a solution of 0.88 g. of sodium carbonate and 2.95 g. of ammonium persulfate in 18.4 g. of deionized water was added. After three minutes 105.2 g. of an acrylic latex preform seed (a butyl acrylate 52 wt. %, methyl methacrylate 46.7 wt. %, methacrylic acid 1.3 wt. % latex, 45% solids, 100 nm. particle size) and 20.9 g. of deionized water was added. After three minutes three separate feeds consisting of: (1) a monomer emulsion of 479.2 g. of deionized water, 5.8 g. of 31.1% sodium lauryl sulfate, 777.6 g. of butyl acrylate, 265.8 g. of methyl methacrylate, 444.6 g. of isodecyl methacrylate and 90.0 g. of methacrylic acid; (2) a chain transfer solution of 18 g. of n-dodecyl mercaptan in 222 g. of methyl methacrylate and; (3) an initiator cofeed of 1.97 g. of ammonium persulfate in 147.9 g. of deionized water were started and fed uniformly over 180 minutes while maintaining a reaction temperature of $82°$-$85°$ C. On completion of the feeds the reaction temperature was maintained at $82°$-$85°$ C. for 30 minutes and then allowed to cool to $75°$ C. Then a solution of 6.07 g. of concentrated ammonium hydroxide and 61.2 g. of deionized water was added, followed by the addition of $0.8_2$ g. of a 1.0% ethylene diamine tetraacetic acid in deionized water solution and 5.3 g. of a 0.15% $FeSO_4 \cdot 7H_2O$ deionized water solution. This was followed by three additional initiator charges at 15 minute intervals, each addition being 0.8 g, of 70% t-butyl hydroperoxide in 3.8 g. of deionized water and 0.4 g. of sodium sulfoxylate formaldehyde in 7.4 g. of deionized water. Fifteen minutes after the last addition, at a reaction mixture temperature of about $50°$ C., a solution of 236.6 g. of deionized water, 98.4 g. of ammonium hydroxide, 62.3 g. of ammonium bicarbonate and 42.5 g. of zinc oxide was added over a 30 minute period. There was then added 40.6 g. of Triton® DN-14 [$CH_3(CH_2)_{15-17}(CH_2CH_2O)_{14}(CH_3CHCH_2O)_2(CH_2CH_2O)_{14}H$, Rohm and Haas Company Trademark] and 20 g. of deionized water, followed by 5.4 g. of benzophenone in 6.9 g. of xylene and 5.35 g. of 30% Proxel® CRL 1,2-benzisothiazolin-3-one, Imperial Chemical Industry Trademark] and 2.69 g. of deionized water. The resultant polymer latex had a total solids of 43.3%, a pH of 9.2, an average particle size of 316 nm. (Brookfield Particle Size Analyzer, Model B1-90), a viscosity of 40 cps. (Brookfield Viscometer, Spindle #2, 60 rpm) and a calculated glass transition temperature (Fox equation) of $-14°$ C.

EXAMPLE 2

PREPARATION OF COMPARATIVE LATEX POLYMER A

To a 5 gallon stirred kettle was added 3819.5 g. deionized water which was heated to 85° C. When the kettle water reached 85° C., 5.3 g. sodium carbonate and 17.7 g. ammonium persulfate dissolved in 110.5 g. deionized water were added. After waiting for 1 minute, 631.3 g. of a seed latex emulsion (45% solids, 100 nm. particle size) was added and rinsed into the kettle with 125.5 g. deionized water. Two minutes after the addition of the seed emulsion, the addition of the monomer emulsion (Table 2.1) and an initiator solution of 11.9 g. ammonium persulfate dissolved in 888.1 g. deionized water were begun. The feeds were timed to run for three hours. Kettle cooling was regulated to maintain a temperature of 82°-85° C. during the polymerization. After a rinse of the monomer emulsion vessel of 137.5 g. deionized water was added to the kettle the batch was held at 82°-83° C. for 30 minutes. A neutralizer of 11.9 g. of ammonia (28%) in 31.4 g. deionized water was added.

After 5 minutes, cooling was begun and 33.0 g. of a 0.15 wt. % solution of $FeSO_4.7 H_2O$ in deionized water, 5.0 g. of a 1% solution of sodium salt of tetraacetic acid in deionized water, 1.0 g. t-butylhydroperoxide (70%) in 5.0 g. deionized water, and 0.5 g. sodium sulfoxylate formaldehyde was added. Cooling was continued to a batch temperature to 60° C. A solution of 1.0 g. t-butylhydroperoxide (70%) in 5.0 g. deionized water was added. After 15 minutes at 60° C. an additional 1.0 g. t-butylhydroperoxide (70%) in 5.0 g. deionized water and 0.5 g. sodium sulfoxylate formaldehyde was added. The batch was then held at 60° C. for 30 minutes. After the hold period the batch was cooled to 45° C. and 265.0 g. deionized water, the final neutralizer (66.35 g. aqua ammonia (28%) in 66.35 g. deionized water), a solution of 32.5 g. benzophenone in 41.4 g. xylene, 2572.6 g. of 21% solids ammonium salt of maleamic acid/diisobutylene copolymer (Tamol ® 165), 48.6 g. of a bactericide (Proxel ® CRL; 10% solution), and a final dilution of 3323.6 g. deionized water were added sequentially with stirring to allow good mixing between each addition. Cooling was continued to below 30° C. and the batch was filtered. The resultant latex had a total solids of 44.8% (theoretical solids was 45.02%); pH=9.4; viscosity of 35 cps. (Brookfield viscosity measured using BI-90 light scattering), a trace of gel on a 100 mesh filter screen, and a calculated glass transition temperature (Fox equation) of −16° C.

TABLE 2.1

| Monomer Emulsion for Example 2 | |
|---|---|
| DI Water | 2740.9 g. |
| Sodium dodecylbenzene sulfonate | 46.9 g. |
| Butyl acrylate | 7061.3 g. |
| Methyl methacrylate | 3654.2 g. |
| Glacial methacrylic acid | 89.7 g. |

EXAMPLE 3

Preparation of Mastic Topcoat 1

The following ingredients were combined and ground for 15 minutes on a high speed Cowles disperser.

| | |
|---|---|
| Water | 152.52 g. |
| Hydroxyethyl cellulose (Natrosol ® 250 MXR) | 4.37 g. |
| Anionic dispersant (30% total solids) (Tamol ® 850) | 4.96 g. |
| Ethylene glycol | 25.4 g. |
| Defoamer (Nopco ® NXZ) | 1.98 g. |
| Potassium tripolyphosphate | 1.49 g. |
| Calcium carbonate (Duramite ®) | 422.72 g. |
| Titanium dioxide (TiPure ® R-960) | 70.37 g. |
| Zinc oxide (Kadox ® 515) | 46.95 g. |

The grind was let down at low speed with the following ingredients:

| | |
|---|---|
| Latex polymer (55% solids) (Rhoplex ® EC-1791) | 470.59 g. |
| Texanol ® coalescent | 7.24 g. |
| Preservative (Skane ® M-8) | 1.00 g. |
| Defoamer (Nopco ® NXZ) | 0.99 g. |
| Aqueous ammonia (28%) | 0.99 g. |

EXAMPLE 4

Preparation of Mastic Topcoat 2

The following ingredients were combined and ground for 15 minutes on a high speed Cowles disperser.

| | |
|---|---|
| Water | 149.20 g. |
| Hydroxyethyl cellulose (Natrosol ® 250 MXR) | 4.10 g. |
| Anionic dispersant (30% total solids) (Tamol ® 850) | 4.70 g. |
| Ethylene glycol | 23.8 g. |
| Defoamer (Nopco ® NXZ) | 2.85 g. |
| Potassium tripolyphosphate | 1.40 g. |
| Calcium carbonate (Alcoa ® C330) | 413.40 g. |
| Titanium dioxide (TiPure ® R-960) | 68.80 g. |
| Zinc oxide (Kadox ® 515) | 45.90 g. |

The grind was let down at low speed with the following ingredients:

| | |
|---|---|
| Latex polymer (55% solids) (Rhoplex ® EC-1791) | 460.20 g. |
| Texanol ® coalescent | 6.80 g. |
| Preservative (Skane ® M-8) | 1.00 g. |
| Defoamer (Nopco ® NXZ) | 2.85 g. |
| Aqueous ammonia (28%) | 0.90 g. |

EXAMPLE 5

Blistering of Mastic Systems

Laboratory Blistering Results

The substrate for all the tests was U.S. Intec Atactic Polypropylenemodified bituminous sheets (Brai ®) in rolls. A 6-inch strip was cut across the Brai ® roll. The strip was then cut six times to give seven equal Brai ® plaques. Each plaque was heated in a 150° C. oven for 15 minutes to flatten the sections and to simulate the roof installation procedure. The tiecoat being tested (Latex Polymer 1 or Comparative Latex Polymer A, 45 wt. % solids) was applied to the plaques which were at ambient temperature using a wire wound draw down rod at 6-7 mils wet thickness. After being dried at 72° F. for 4 hours the tiecoats were topcoated by drawing 20 mils wet of a 50 wt. % solids mastic topcoat (Mastic Topcoat 1 or 2) via a drawdown bar. After being allowed to dry for 24 hours at 72° F. the plaques were placed under one inch of deionized water and kept under water for the entire time of the test. The plaques were examined daily and when 5% of the plaque area was covered with blisters it was rated as having failed the test. The tests were usually stopped after 21–28 days.

TABLE 5.1

| Laboratory Blistering Results | | |
|---|---|---|
| Tiecoat | Topcoat | Days to Blistering* |
| Latex Polymer 1 | Mastic Topcoat 2 | >28 |
| Latex Polymer 1 | Mastic Topcoat 1 | >21 |
| Latex Polymer 1 | Mastic Topcoat 2 | >21 |
| Comparative A | Mastic Topcoat 1 | 11 |
| Comparative A | Mastic Topcoat 2 | 11 |
| None** | Mastic Topcoat 1 | 4 |
| None** | Mastic Topcoat 2 | 1 |

*The designation > means greater than the number of days indicated. When > appears, the test was stopped on that day, but blistering had not yet been observed.
**No tiecoat was used. The topcoat was applied directly onto the Brai ® substrate.

Outdoor Blistering Results

Plaques were prepared in the same fashion as for the laboratory tests and were then placed outdoors in a concave holder to allow water to collect.

TABLE 5.2

| Outdoor Blistering Results | | |
|---|---|---|
| Tiecoat | Topcoat | Days to Blistering |
| Latex Polymer 1 | Mastic Topcoat 1 | >28 |
| Latex Polymer 1 | Mastic Topcoat 2 | >28 |
| Comparative A | Mastic Topcoat 1 | 7 |
| Comparative A | Mastic Topcoat 2 | 7 |

EXAMPLE 6

Latex Polymers Having Different Molecular Weights

Latex polymers 6A, 6B, 6C and 6D were prepared according to the procedure of Example 1, except the amount of n-dodecyl mercaptan used was as indicated below. Weight average molecular weight was determined by hydrolyzing the polymer to its acrylic acid/-methacrylic acid backbone and determining the weight average molecular weight by aqueous gel permeation chromatography.

TABLE 6.1

| Polymer Molecular Weights | | |
|---|---|---|
| Latex Polymer | Wt. % of n-DDM* | Mw |
| 6A | 0 | 257,000 |
| 6B | 0.25 | 80,600 |
| 1 | 1.0 | 31,600 |
| 6C | 2.5 | 15,800 |
| 6D | 3.0 | 9,050 |

*Wt. % n-dodecyl mercaptan based on the weight of total monomers.

EXAMPLE 7

Effect of Latex Polymer Molecular Weight on Blistering of Mastic Coating Systems*

Mastic coating systems were prepared according to the procedure in Example 5. Latex polymers with different molecular weights were evaluated for blister resistance following the procedure in Example 5. The results are shown below.

TABLE 7.1

| Effect of latex polymer molecular weight | | |
|---|---|---|
| Tiecoat | Latex Polymer Mw | Days to Blistering |
| Latex Polymer 6A | 257,000 | 11,6** |
| Latex Polymer 6B | 80,600 | >21 |

TABLE 7.1-continued

| Effect of latex polymer molecular weight | | |
|---|---|---|
| Tiecoat | Latex Polymer Mw | Days to Blistering |
| Latex Polymer 1 | 31,600 | >21,>28** |
| Latex Polymer 6C | 15,800 | >21 |
| Latex Polymer 6D | 9,050 | 14,6** |

*The topcoat for all samples was Mastic Topcoat 2.
**Repeat determination

EXAMPLE 8

Latex Polymer Preparations with Different Levels of Methacrylic Acid

Latex Polymer 8A was prepared according to the procedure of Example 1, except for the monomer composition which was butyl acrylate, 43.25 wt. %; isodecyl methacrylate, 24.75 wt. %; methyl methacrylate, 28.25 wt. %; and methacrylic acid, 3.75 wt. %.

Comparative Latex Polymer 8B was also prepared according to the procedure in Example 1, except for the monomer composition which was butyl acrylate, 43.25 wt. %; isodecyl methacrylate, 24.75 wt. %; methyl methacrylate, 29.5 wt. %; and methacrylic acid, 2.5 wt. %.

EXAMPLE 9

Effect of Methacrylic Acid in the Latex Polymer on Blistering of MasticCoating Systems Mastic coating systems were prepared according to the procedure in Example 5. Polymers having different levels of methacrylic acid in the tiecoat were evaluated for blister resistance following the procedure in Example 5. The results are shown below.

TABLE 9.1

| Effect of Methacrylic Acid | | |
|---|---|---|
| Tiecoat | Wt. % Methacrylic Acid | Days to Blistering* |
| Latex Polymer 1 | 5.0 | >28 |
| Latex Polymer 8A | 3.75 | >28 |
| Comparative Latex plymr 8B | 2.5 | 6 |

*The topcoat for all the systems was Mastic Topcoat 2.

EXAMPLE 10

Tiecoat Preparations with Different Molar Ratios of Zinc to Methacrylic Acid

Tiecoat 10A was prepared according to the procedure of Example 1, except the molar ratio of zinc to methacrylic acid was doubled to 1:1.

Comparative Tiecoat 10B was prepared according to the procedure in Example 1, except the molar ratio of zinc to methacrylic acid was halved to 0.25:1.

EXAMPLE 11

Effect of the Molar Ratio of Zinc to Methacrylic Acid in the Tiecoat on Tack

Tack testing was conducted with tiecoats applied to Brai ® plaques which had been placed in direct sunlight. With a paint brush, a coating of tiecoat was applied. The coating was allowed to dry for one hour. The surface temperature was measured with an infrared heat detector and was 135° F. Tack was determined subjectively by finger touch.

TABLE 11.1

Effect of Zinc/Methacrylic Acid Ratio

| Tiecoat | Maler Ratio Line/Methacrylic Acid | Tack Result |
| --- | --- | --- |
| Latex Polymer 10A | 1.0 | Pass |
| Latex Polymer 1 | 0.5 | Pass |
| Comparative Latex Polymer 10B | 0.25 | Fail |

EXAMPLE 12

Wet and Dry Adhesion of Tiecoat

The adhesion of the tiecoat to Brai ® was measured by depositing by painting 45% solids tiecoat over a 4×6 inch plaque of Brai. ® When the tiecoat was still tacky a 1×10 inch strip of airplane cloth was placed in the center of test strip and enough tiecoat was painted over the cloth to completely cover it. The adhesion was determined by placing the strip in an Instron testing device. The lower jaw was clamped onto the Brai ® plaque; the upper jaw was clamped to the airplane cloth. The crosshead was raised at 2 inch/minute. The adhesion measured in lbs./linear-inch was read directly off the chart recorder. The wet adhesion was measured in a similar manner except that the test panel was soaked for two weeks in tap water prior to testing.

TABLE 12

Wet and Dry Adhesion of Tiecoat

| Tiecoat | Adhesion (lbs.) Wet | Dry |
| --- | --- | --- |
| Latex Polymer 1 | 0.4 | 0.6 |
| Comparative Latex Polymer A | 0.0 | 0.6 |

What is claimed is:

1. A method for improving the quality of a mastic coating system comprising:
   (a) forming a tiecoat composition;
   (b) applying the tiecoat composition to a substrate surface; and
   (c) applying a mastic coating onto said tiecoat composition;

and where said improvement comprises selecting said tiecoat composition comprising a water-insoluble latex polymer and a multivalent metal ion, wherein the latex polymer is prepared from a monomer mixture comprising at least 20 weight %, based on the weight of the monomer mixture, of at least one hydrophobic monomer selected from the group consisting of $C_4$–$C_{20}$ alkyl methacrylates and $C_8$–$C_{20}$ alkyl acrylates, and from about 3.0 weight % to about 7.5 weight % of methacrylic acid, based on the weight of the monomer mixture, and where the latex polymer has a glass transition temperature of from about $-20°$ C. to about $5°$ C., and where the molar ratio of the multivalent metal ion to the methacrylic acid in the latex polymer is from about 1:1 to about 0.375:1.

2. The method of claim 1 wherein the weight average molecular weight of the latex polymer is from about 10,000 to about 150,000.

3. The method of claim 1 wherein the monomer mixture comprises from about 20 weight % to about 40 weight % of the hydrophobic monomer, based on the weight of the monomer mixture.

4. The method of claim 1 wherein the hydrophobic monomer is further selected from the group consisting of isodecyl methacrylate, isobutyl methacrylate, and mixtures thereof.

5. The method of claim 1 wherein the monomer mixture comprises from about 3.5 weight % to about 5.0 weight % of methacrylic acid, based on the weight of the monomer mixture.

6. The method of claim 1 wherein the latex polymer has a glass transition temperature of from about $-20°$ C. to about $-10°$ C.

7. The method of claim 1 wherein the multivalent metal ion is zinc.

8. The method of claim 1 wherein the molar ratio of the multivalent ion to the methacrylic acid in the latex polymer is about 1:2.

9. The method of claim 1 wherein the substrate surface is asphalt or bitumen.

* * * * *